United States Patent
Guethle

[11] 3,762,457
[45] Oct. 2, 1973

[54] TIRE CHAIN ASSEMBLY
[76] Inventor: Clyde A. Guethle, 2339 Dawes, St. Louis, Mo. 63114
[22] Filed: Nov. 8, 1971
[21] Appl. No.: 196,565

[52] U.S. Cl. .................. 152/239, 152/171, 152/243
[51] Int. Cl. ............................................. B60c 27/20
[58] Field of Search .................... 152/171, 232, 239, 152/243

[56] References Cited
UNITED STATES PATENTS
1,324,395  12/1919  Griffin ................................ 152/239
2,934,125  4/1960   Erving ................................ 152/239
1,267,269  5/1918   Rettell ............................... 152/171
2,420,758  5/1947   Owings .............................. 152/239

Primary Examiner—James B. Marbert
Attorney—Rogers, Ezell, Eilers & Robbins

[57] ABSTRACT

This invention relates to a tire chain design and construction comprising a plurality of rectangular links. Each link is pivotally connected to adjacent links forming a checkerboard type pattern of alternate links and spaces, the number of links being sufficient to extend substantially around the circumference of the tire and at least the width of the tire tread. The pivotal connections between the links comprise bushing means associated with each pivotal connection such that the bushing means define distinct rows, each bushing means having a hole therethrough in axial alignment with the holes of the other bushing means in its row. A cable extends through the holes in each row of bushings, and terminal means are fastened to the ends of each of the cables for holding the links in said pattern. Means are also provided for securing the chain assembly around the tire.

14 Claims, 8 Drawing Figures

PATENTED OCT 2 1973

3,762,457

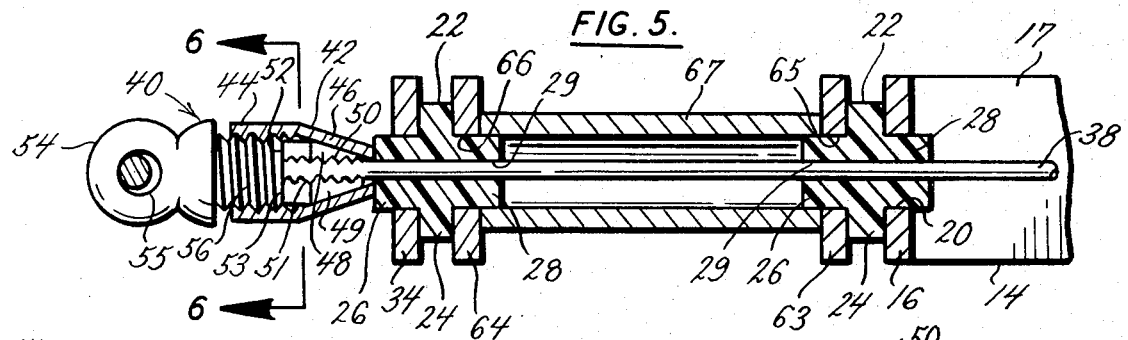
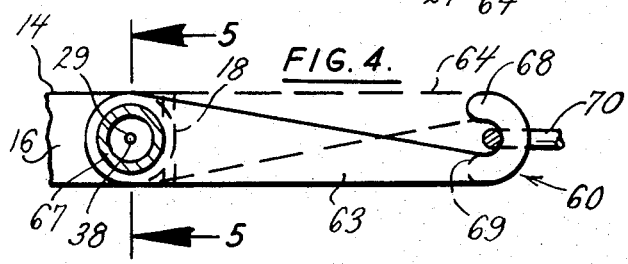
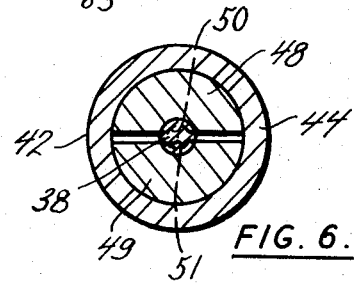
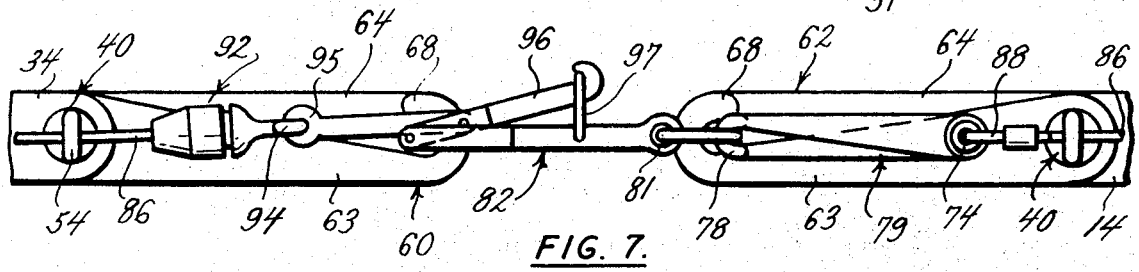
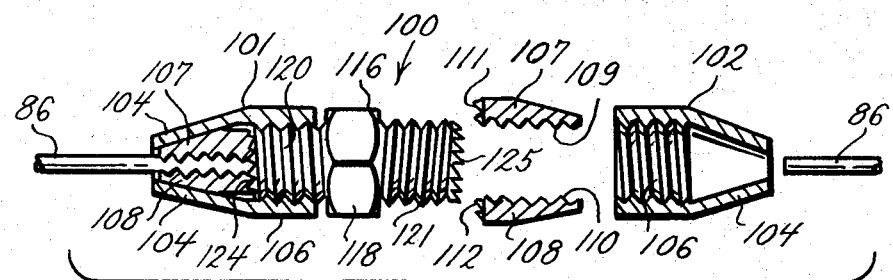
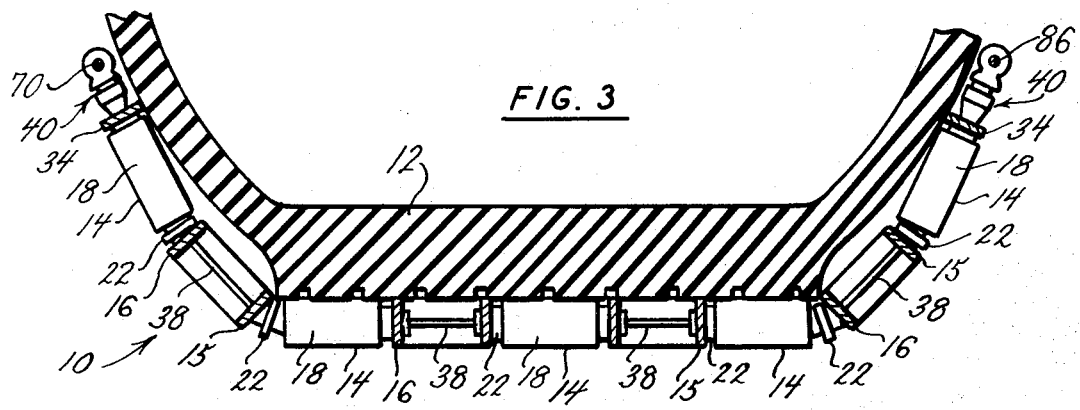

TIRE CHAIN ASSEMBLY

SUMMARY OF THE INVENTION

This invention relates to a novel tire chain construction and design and particularly to one that provides exceptional stopping capability on ice as well as snow.

One of the problems with tire chain designs in general is their inability to provide good stopping capability on ice. Either the chains are not designed to provide a sufficient bite into the ice, or the chain sections are spaced so far apart that they slip out from under the tire when the brakes are applied. Another problem with prior art tire chains is the difficulty of repair or replacement of worn or broken parts. Such repairs are often a major project and in many cases the entire tire chain assembly must be discarded for a new one. Since repairs must often be made under unfavorable weather conditions, it is important that they can be made easily and quickly requiring a minimum of tools.

Hence, it is one of the primary objects of this invention to provide a novel tire chain design that provides exceptional stopping capability on ice as well as snow, as well as providing exceptional driving traction on ice and snow.

Another primary object of this invention is to provide a novel tire chain design wherein worn or broken parts can be easily replaced or repaired.

The tire chain design of this invention generally includes a plurality of rectangular steel links arranged in rows such that the ends of the links in one row are positioned between the opposite ends of the links in an adjacent row to give a generally checkerboard design. Bushings are located between the links, the bushings having holes through which cables extend to hold the links in position. The cables are terminated in eyelets through which other cables are threaded. Means are provided for drawing these other cables tight around the inner and outer walls of the tire and for connecting the ends of the chain assembly together to secure the chain assembly around the tire.

The eyelet assemblies and various other connecting devices used in this invention can be assembled and disassembled with conventional hand tools making disassembly of the tire chain and replacement of any of its parts relatively easy. This invention also includes a novel cable splicing device for use should any of the cables break.

DESCRIPTION OF THE DRAWINGS

FIG. 3 is a view in section take along the line 3—3 of FIG. 1;

FIG. 4 is an enlarged view in section taken along the line 4—4 of FIG. 2;

FIG. 5 is a view in section taken along the line 5—5 of FIG. 4;

FIG. 6 is an enlarged view in section taken along the line 6—6 of FIG. 5;

FIG. 7 is an enlarged view in section taken along the line 7—7 of FIG. 2; and

FIG. 8 is an exploded view with parts in section of a cable splicing device that can be used with this invention.

DESCRIPTION OF A PREFERRED EMBODIMENT

Figure 1:
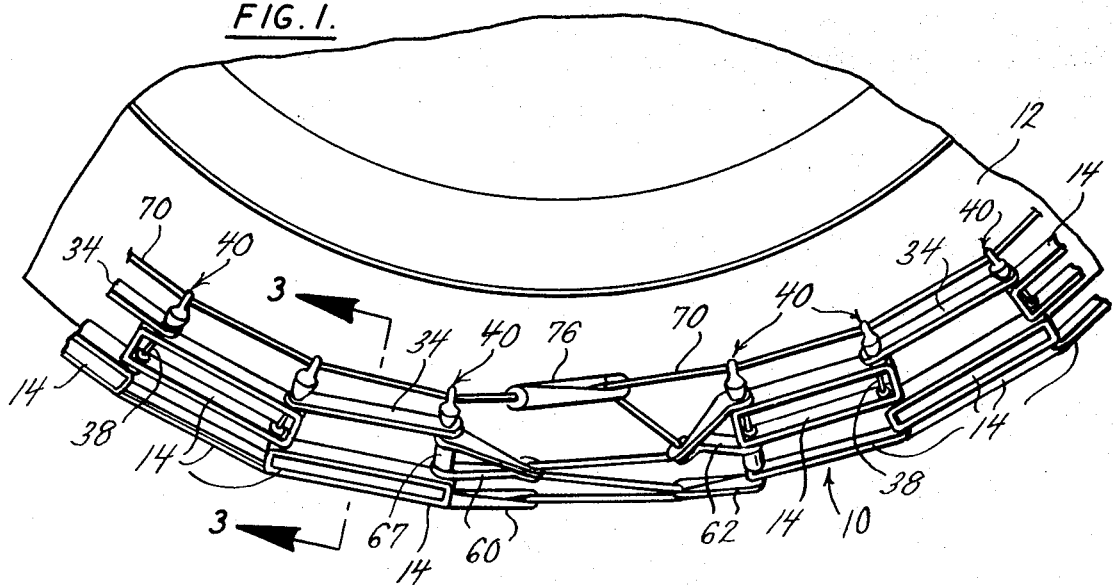
FIG. 1 is a side elevational view of the tire chain assembly of this invention shown mounted on a vehicle tire.
Figure 2:
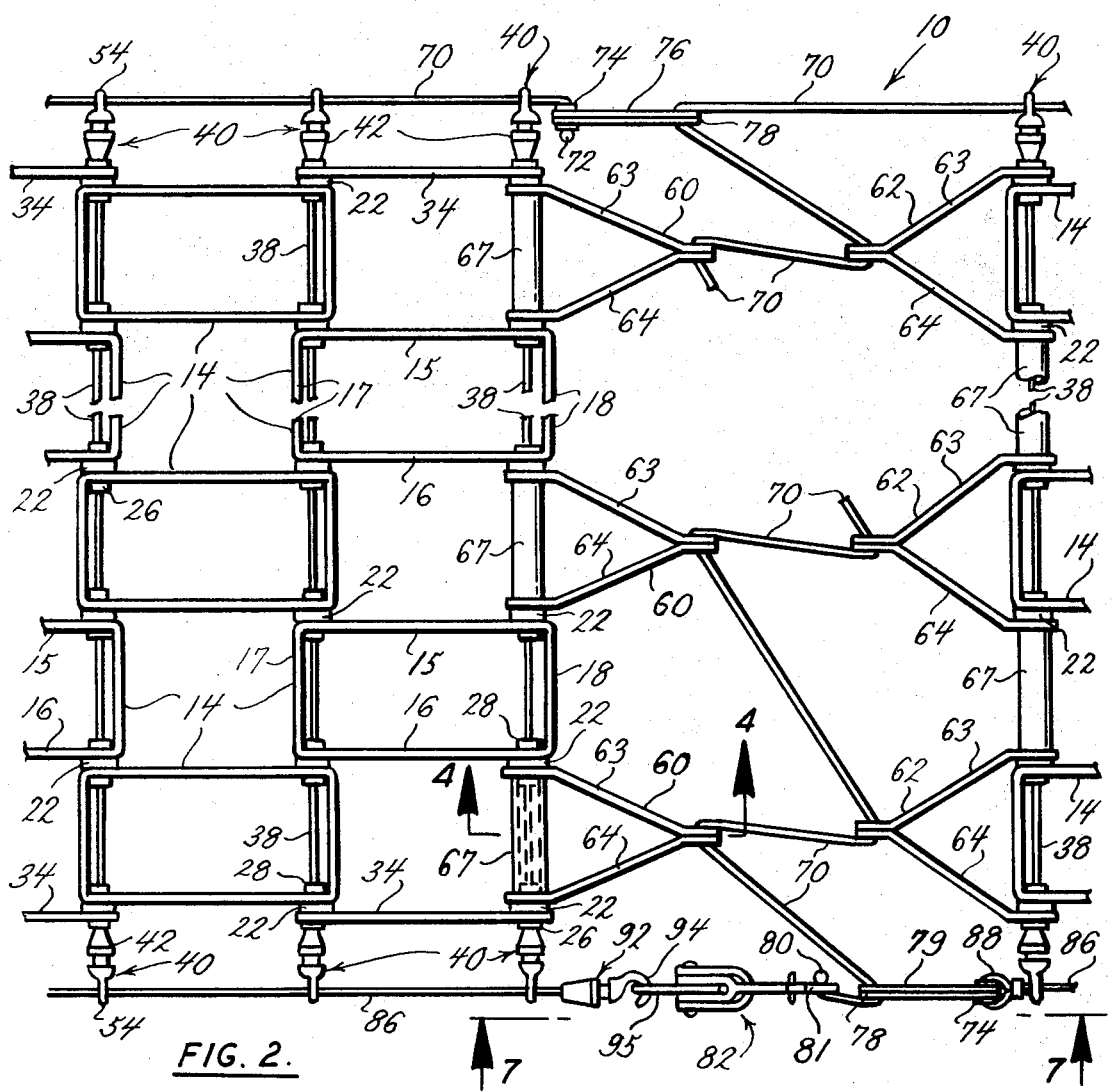
FIG. 2 is a partial broken plan view of the tire chain assembly of this invention.

In the drawings there is shown a tire chain assembly 10 of this invention with FIG. 1 showing the assembly mounted to a vehicle tire 12. The chain assembly 10 includes a plurality of rectangular links 14 each having side walls 15 and 16 and end walls 17 and 18, and assembled in a checkerboard pattern as best shown in FIG. 2 with the end walls 18 of one row of links being positioned between the end walls 17 of adjacent rows of links. At each end of each side wall 15 and 16 of each link 14 is an aperture 20 (FIG. 5) for receiving a bushing 22 of rubber or suitable material. Each bushing has a large cylindrical portion 24 that fits between each link 14, small cylindrical portions 26 and 28 that extend from each side of the portion 24 and fit into the apertures 20, and a hole 29 extending axially therethrough.

To even the rows of links at the sides of the chain assembly 10, every other row of links terminates in a bar 34 which also has apertures at each of its ends equally spaced with the apertures 20 in the sides 15 and 16 of the links 14 for receiving bushings 22. The links 14 and bars 34 are preferably of rectangular cross section to provide a better bite into ice and snow and made of tempered steel for strength.

The links 14 and bars 34 are held in the relative positions shown in FIG. 2 by a series of cables 38 that extend through the apertures 29 of each row of bushings 22. The cables 38 are terminated at each of their ends with eyelet assemblies 40.

Referring primarily to FIG. 5, each eyelet assembly 40 has a sleeve 42 having an internally threaded portion 44 and a tapered end portion 46. A pair of wedge members 48 and 49 having inner serrated surfaces 50 and 51 and flat top surfaces 52 and 53, respectively, seat within the tapered portion 46. A head portion 54 formed in an eyelet 55 has a threaded shank 56 extending therefrom for insertion into the threaded portion 44 of the sleeve 42. The end of the threaded shank 56 is flat to engage the flat surface 52 and 53 of the wedges 48 and 49.

To attach an eyelet assembly 40 to a cable 38, the end of the cable is placed between the serrated surfaces 50 and 51 of the wedges 48 and 49 inside the sleeve 42 with the cable extending through the end of the tapered portion 46. The head 54 is then screwed into the sleeve 42 forcing the wedges into the tapered portion 46 such that the serrated surfaces 50 and 51 tightly engage the cable 38. In this way the eyelet assemblies 40 are firmly secured at the ends of the cables 38 to hold the links and bars in the pattern of FIG. 2.

To connect the ends of the chain assembly 10 a series of connecting devices 60 and 62 are used, each having a pair of pivotal arms 63 and 64 spaced apart or open at one end, and together or closed at the other. The spaced end of the arms 63 and 64 have apertures 65 and 66, respectively, (FIG. 5) for receiving the cylindrical portions 28 and 26 of the bushings 22. The open end of the device 60 is sufficiently wide to straddle a spacer element 67 located between links at each end of the chain assembly, and the open end of the device 62 is sufficiently wide to straddle the width of a link 14 as best shown in FIG. 2. Bushings 22 are located between the devices 60 and 62 and their adjacent links 14 such that each arm 63 and 64 of the devices 60 and 62 is allowed to pivot about a bushing. The closed ends of these devices are formed in hooks with the closed end of one of the arms, such as the arm 63, formed in an upwardly turned hook 68, and the closed end of the other arm, such as the arm 64, formed in a downwardly turned hook 69 (see FIGS. 4 and 7).

To hold the chain assembly 10 around the tire 12, a cable 70, with one end connected as at 72 to the pivotal end 74 of a cable connecting device 76 located at one side of the chain assembly 10, is threaded through each of the eyelets 40 on that same side of the chain assembly, continuously through the hook end 78 of the connector 76, alternately through each of the hook ends of the devices 60 and 62, and through the hook end 78 of another connecting device 79 identical to the device 76 and located at the other side of the chain assembly 10. The other end of the cable 70 is connected as at 80 to one end 81 of a load binder 82. The connecting devices 76 and 79 are basically similar to the devices 60 and 62 except that their arms are straight and connected together at the pivotal ends 74.

Another cable 86 has one end connected as at 88 to the pivotal end 74 of the connecting device 79, and extends through each of the eyelets 40 on that same side of the chain assembly 10 with its other end fastened to a hook assembly 92. The hook assembly 92 is made in substantially the same manner as the eyelet assembly 40 except that the head of the hook assembly 92 is formed in a hook 94 rather than an eyelet. The hook 94 engages the other end 95 of the load binder 82. The load binder 82 has a lever 96 for drawing its ends 81 and 95 together. A releasable catch 97 locks the lever in place.

In FIG. 8 there is shown a cable splicer for use should one of the cables 70 or 86 break. The construction of the splicer 100 is very similar to that of the eyelet assembly 40. It includes two sleeves 101 and 102, each having a tapered portion 104 and an internally threaded portion 106, the outer surface of which is preferably hexagon shaped. A pair of wedges 107 and 108 with inner serrated surfaces 109 and 110 and top serrated surfaces 111 and 112 are seated within the tapered portions 104 of each of the sleeves. A bolt 116 has a hexagon head portion 118 and two oppositely extending threaded shank portions 120 and 121 which thread into the threaded portions 106 of the sleeves 101 and 102, respectively. The shank portions 120 and 121 have serrated end surfaces 124 and 125 that engage the top serrated surfaces 111 and 112 of the wedges 107 and 108.

To operate the cable splicer 100, one severed end of the cable to be spliced such as, for example, the cable 86, is placed between the inner serrated surfaces 109 and 110 of the wedges 107 and 108 within the tapered portion 104 of the sleeve 101, and the other end of the severed cable is placed between the serrated surfaces 109 and 110 of the wedges 107 and 108 within the tapered portion 104 of the sleeve 102. Next, the shank 120 is threaded into the portion 106 of the sleeve 101 and the shank 121 is threaded into the portion 106 of the sleeve 102. Eventually, the serrated surfaces 124 and 125 will engage the serrated surfaces 111 and 112 of the wedges 107 and 108 to lock the cable 86, wedges 107 and 108, and the bolt 116 in rotating engagement. To tighten the cable splicer securely, the head 118 of the bolt 116 is held in place and the sleeves 101 and 102 turned to force the wedges tightly into the tapered ends 104. The serrated surfaces 109 and 110 hold the ends of the cable firmly.

OPERATION AND MOUNTING

To mount the tire chain assembly 10 to a tire, the chain is placed around the tire as best shown in FIGS. 1 and 3 with the bushings 22 allowing the chain to bend around the tire walls. Next, the cable 70 is placed within the hook ends of the connecting devices 76, 60, and 62 by first pivoting the arms of these connecting devices to open the hook ends, placing the cable within the hooks, and then closing the arms to secure the cable. The hook assembly 92 is hooked into the end of the load binder 82, and the lever arm 96 of the load binder 82 closed and locked with the catch 97 to pull each of the cables 70 and 86 tight. In this manner the chain assembly 10 is tightened around the tire.

The links 14, being preferably rectangular in shape, provide edges and corners that bite into ice or snow to greatly increase the stopping capabilities and driving traction of the vehicle in these kinds of road conditions. Should any portion of the chain assembly break or wear out, it is a reasonably simple task to replace the worn or broken part with only conventional hand tools. Specifically, removal of appropriate eyelet assemblies 40 allows removal of appropriate cables 38 and hence replacement of nearly any part of the chain assembly. Also, if a break should occur in either the cable 70 or 86, it can be easily mended by use of the cable splicer 100.

Various changes and modifications may be made in this invention, as will be readily apparent to those skilled in the art. Such changes and modifications are within the scope and teaching of this invention as defined by the claims appended hereto.

What is claimed is:

1. A tire chain assembly comprising a plurality of rectangular links, means for pivotally connecting each link to adjacent links forming a checkerboard type pattern of alternate links and spaces, the number of links being sufficient to extend substantially around the circumference of the tire and at least the width of the tire tread, the pivotally connecting means including bushing means between each connection such that the bushing means define distinct rows, each bushing means having a hole therethrough in axial alignment with the holes of the other bushing means in its row, a first cable extending through the holes in each row of bushings, terminal means fastened to the ends of the first cables for holding the links in said pattern and said relative pivotal engagement, and means for securing the chain assembly around the tire.

2. The tire chain assembly of claim 1 wherein the links are arranged such that the first cables extend across the width and beyond the edges of the tire tread surface, and the means for securing the chain assembly around the tire includes means for securing the ends of the first cables against the inner and outer walls of the tire.

3. The chain assembly of claim 2 wherein the terminal means further comprises eyelet assemblies mounted at the ends of each first cable, and the last-named securing means includes an inner cable extending through the eyelet assemblies nearest the inner wall of the tire, an outer cable extending through the eyelet assemblies nearest the outer wall of the tire, and means for drawing the inner and outer cables against the inner and outer walls, respectively, of the tire.

4. The chain assembly of claim 2 including terminating bars at the sides of the chain assembly, which bars are pivotally connected to adjacent links to close the spaces therebetween, and spacer elements mounted at the ends of the chain assembly between adjacent links to close off the spaces therebetween.

5. The chain assembly of claim 4 including means for connecting the ends of the chain assembly together, which end connecting means comprises a plurality of connecting devices, each pivotally connected at one end across the end of a link or spacer element located at an end of the chain assembly, each connecting device having opposing hooks at its other end, means for threading the inner or outer cables alternately through the hooks of the connecting devices located at each end of the cable assembly, and means for drawing this last-named cable tight, thereby tightening the chain assembly around the tire.

6. The chain assembly of claim 1 wherein the terminal means comprises a sleeve having an internally threaded portion and a tapered portion, a plurality of wedges that seat within the tapered portion having facing serrated surfaces which engage an end of a first cable, and a head portion having a threaded shank which extends into the internally threaded portion of the sleeve, such that the end of the shank forces the wedges into the tapered portion as the shank is screwed into the sleeve, thereby forcing the wedges together to tightly engage the end of the cable.

7. A cable connector comprising at least one sleeve having an internally threaded cylindrical portion and a tapered portion, a plurality of wedges seated within the tapered portion having facing serrated surfaces which engage the end of a cable, and a head member having at least one threaded shank which extends into the internally threaded portion of the sleeve such that the end of the shank forces the wedges into the tapered portion as the shank is screwed into the sleeve, thereby forcing the wedges together to tightly engage the end of the cable.

8. The cable connector of claim 7 wherein the head member is formed in an eyelet.

9. The cable connector of claim 7 wherein the head member is formed in a hook.

10. The cable connector of claim 7 including a second sleeve having an internally threaded portion pitched opposite to that of the first sleeve and a tapered portion, a second plurality of wedges that seat within the tapered portion of the second sleeve, the second plurality of wedges having facing serrated surfaces which engage another cable end, the head member having a second threaded shank pitched opposite to the threads of the first shank which extends into the internally threaded portion of the second sleeve, such that the end of the second shank forces the second plurality of wedges into the tapered portion of the second sleeve as the second shank is screwed into the second sleeve, thereby forcing the second plurality of wedges together to tightly engage the other cable end.

11. The cable connector of claim 10 wherein the tops of the wedges and the ends of the shanks are serrated, whereby when the shanks engage the tops of the wedges, the head member, wedges, and cable ends lock in rotating engagement with respect to the sleeves.

12. A tire chain assembly comprising a plurality of links, means for pivotally connecting each link to adjacent links forming a checkerboard-type pattern of alternate links and spaces, the number of links being sufficient to extend substantially around the circumference of the tire and at least the width of the tire tread, the pivotally connecting means including holes through each link such that the holes define distinct rows, the holes in each row being in axial alignment, a first flexible cable extending through the holes in each row of holes, terminal means at the ends of the first cables for holding the links in said pattern and said relative pivotal engagement, and means for securing the chain assembly around the tire.

13. The tire chain assembly of claim 12 wherein the links are rectangular.

14. The tire chain assembly of claim 13 wherein the links are open.

* * * * *